United States Patent
Griffin

(10) Patent No.: US 7,622,895 B1
(45) Date of Patent: Nov. 24, 2009

(54) POWER LEVEL DISPLAY CALIBRATION DEVICE

(75) Inventor: Paul Griffin, Nashville, TN (US)

(73) Assignee: Griffin Technology, Inc., Nashville, TN (US)

( * ) Notice: Subject to any disclaimer, the term of this patent is extended or adjusted under 35 U.S.C. 154(b) by 33 days.

(21) Appl. No.: 11/388,036

(22) Filed: Mar. 23, 2006

(51) Int. Cl.
*H02J 7/00* (2006.01)

(52) U.S. Cl. .................... 320/132; 320/107; 320/128

(58) Field of Classification Search .......... 320/101, 320/106, 107, 108, 109, 112, 114, 130, 132, 320/134, 150, 125, 128, 133; 429/27, 38, 429/100; 307/125; 340/636.1, 636.19, 636.2
See application file for complete search history.

(56) References Cited

U.S. PATENT DOCUMENTS

| | | | |
|---|---|---|---|
| 3,796,940 A | 3/1974 | Mauch et al. | 320/14 |
| 4,734,635 A | 3/1988 | Theobald | 320/13 |
| 5,196,779 A | 3/1993 | Alexandres et al. | 320/14 |
| 5,455,499 A * | 10/1995 | Uskali et al. | 340/636.1 |
| 5,541,489 A | 7/1996 | Dunstan | 320/2 |
| 5,563,491 A * | 10/1996 | Tseng | 320/109 |
| 5,691,742 A | 11/1997 | O'Connor et al. | 345/116 |
| 5,698,961 A | 12/1997 | Kutz et al. | 320/15 |
| 5,705,910 A | 1/1998 | Kito et al. | 320/5 |
| 5,793,188 A | 8/1998 | Cimbal et al. | 320/130 |
| 5,818,197 A * | 10/1998 | Miller et al. | 320/107 |
| 5,889,383 A * | 3/1999 | Teich | 320/107 |
| 5,890,780 A | 4/1999 | Tomiyori | 307/86 |
| 5,955,869 A * | 9/1999 | Rathmann | 320/132 |
| 5,963,017 A | 10/1999 | Yeh et al. | 320/132 |
| 6,014,011 A * | 1/2000 | DeFelice et al. | 320/114 |
| 6,027,828 A * | 2/2000 | Hahn | 429/100 |
| 6,157,169 A * | 12/2000 | Lee | 320/132 |
| 6,191,551 B1 * | 2/2001 | Fischer et al. | 320/106 |
| 6,198,253 B1 * | 3/2001 | Kurle et al. | 320/132 |
| 6,211,647 B1 * | 4/2001 | Wendelrup et al. | 320/112 |
| 6,236,186 B1 * | 5/2001 | Helton et al. | 320/106 |
| 6,337,557 B1 * | 1/2002 | Kates et al. | 320/112 |
| 6,545,448 B1 * | 4/2003 | Stanley et al. | 320/132 |
| 6,569,555 B1 * | 5/2003 | Faris et al. | 429/27 |
| 6,623,294 B2 * | 9/2003 | Tse et al. | 439/501 |
| 6,677,727 B1 * | 1/2004 | Wendelrup et al. | 320/112 |
| 6,850,039 B2 * | 2/2005 | Popescu | 320/134 |
| 6,975,092 B2 * | 12/2005 | Edington et al. | 320/106 |
| 7,034,506 B2 * | 4/2006 | Chen et al. | 320/136 |
| 7,151,356 B1 * | 12/2006 | Chen | 320/107 |
| 2003/0146733 A1 * | 8/2003 | Miller et al. | 320/106 |
| 2003/0160590 A1 * | 8/2003 | Schaefer et al. | 320/107 |

(Continued)

*Primary Examiner*—Edward Tso
*Assistant Examiner*—M'Baye Diao
(74) *Attorney, Agent, or Firm*—Hornkohl Intellectual Property Law PLLC; Jason L. Hornkohl

(57) ABSTRACT

A charging accessory for a portable electronic device has an input/output port for providing electrical connections to an input/output port of the device. The accessory includes a charger for charging the battery of the portable electronic device and a discharging circuit for discharging the battery of the device. A processor in the accessory determines when the device battery is fully charged and fully discharged. A time stamp associated with a charging/discharging cycle and device identification information identifying the particular device upon which the charging cycle was performed is stored in a memory of the accessory. The charging accessory then automatically performs a discharging/charging operation for the device according to a predetermined schedule to recalibrate a battery level display of the device whenever the accessory is coupled to the device.

15 Claims, 3 Drawing Sheets

U.S. PATENT DOCUMENTS

| | | |
|---|---|---|
| 2004/0146772 A1* | 7/2004 | Miyao et al. .................. 429/38 |
| 2004/0183502 A1* | 9/2004 | Cheng ........................ 320/108 |
| 2005/0007063 A1* | 1/2005 | Sekai ......................... 320/101 |
| 2005/0017676 A1* | 1/2005 | Takimoto et al. ............ 320/107 |
| 2005/0035738 A1* | 2/2005 | Patino et al. ................. 320/106 |
| 2005/0237030 A1* | 10/2005 | Takenaka .................... 320/150 |
| 2006/0028174 A1* | 2/2006 | Hsiao ......................... 320/112 |
| 2006/0255767 A1* | 11/2006 | Wong et al. ................. 320/130 |
| 2007/0126393 A1* | 6/2007 | Bersenev .................... 320/107 |

* cited by examiner

POWER LEVEL DISPLAY CALIBRATION DEVICE

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

FIELD OF THE INVENTION

The invention is generally directed toward the field of power charging accessories for portable electronic devices. More particularly, the present invention is directed toward a device that calibrates a power level reading for a device having a rechargeable power supply.

BACKGROUND OF THE INVENTION

A wide variety of modern devices utilize rechargeable batteries. These devices often have a power controller, which may be included in the battery or the device itself, that provides an estimate of the amount of energy in the battery during charging and discharging that is used to produce a power level display or reading. The maximum, minimum, and display changing power levels, i.e. power bars, for the power level display are either hard wired into the device or determined under a specific set of circumstances. Unfortunately, the charge capacity of a rechargeable battery changes over the lifetime of the battery. Thus, the power controller needs to be recalibrated from time to time to keep the power level display accurate. The power controller typically waits until the battery is completely discharged and then recharged in a single full cycle discharging/charging operation to set the new maximums, minimums and display levels. Doing so insures that the true maximum and minimum charge levels can be determined and displayed. Unfortunately, many users do not periodically fully discharge and recharge their device's batteries as recommended by battery manufacturers. This may lead to an unexpected loss of power when a power level display indicates that power remains or the consumer believing that the battery needs charging when in reality it still retains a sufficient charge for operation. Either situation can lead to a loss of consumer goodwill. Therefore, what is needed is a new and improved method and device for automatically recalibrating a power level display to insure its accuracy.

BRIEF SUMMARY OF THE INVENTION

An embodiment of the present invention is directed toward a charging accessory for a portable electronic device such as a digital music player having an input/output port. The charging accessory includes an input/output port for providing electrical connections to the device's input/output port. The charging accessory has an adapter that is used to receive a power supply voltage from an external power source. A discharging circuit in the charging accessory automatically discharges the battery of the portable electronic device. The discharging may also be accomplished by enabling a power drawing feature of the device. A charger in the charging accessory then charges the battery of the portable electronic device. A processor determines when the device battery is fully charged and fully discharged. Alternatively, the device itself may determine when the battery is fully charged and stop the charging with its power management system or the accessory may simply keep charging until it is disconnected from the device. A display indicates a status of the charging and discharging so that a user can determine when the operation is complete. The processor saves a time stamp associated with the charging/discharging time and device identification information such as a serial number in a memory. The charging accessory can then automatically perform a discharging/charging operation for the device according to a predetermined schedule. The charging accessory may also include a transmitter for broadcasting a signal received from the portable electronic device to a remote receiver.

Another embodiment of the present invention is directed toward a charging accessory for a portable electronic device. The charging accessory includes an automatic charging and discharging circuit for automatically discharging and charging a battery of a device when the device is connected to the charging accessory to facilitate calibration of a battery level display of the device. The charging accessory includes a processor that determines when the device battery is fully charged and fully discharged. The processor saves a time stamp associated with a charging time and device identification information associated with the particular device being charged in a memory and then automatically performs a discharging/charging operation for the device according to a predetermined schedule whenever the charging accessory is connected to the device.

Yet another embodiment of the present invention is directed toward a method of calibrating a battery level display of a portable electronic device with a charging accessory for the device. The method begins by detecting when the charging accessory is coupled to the portable electronic device. Once the device is detected, the device's battery is automatically discharged to a predetermined level with the charging accessory. The device's battery is then automatically charged to a predetermined level with the accessory. Preferably, the device battery is fully discharged and fully charged. A visual indication of a status of the discharging and charging is produced so that a user can determine when the device is ready to use. A time stamp associated with a charging time may be produced and device identification information and the time stamp stored such that a discharging/charging operation for the device can be automatically performed according to a predetermined schedule.

DETAILED DESCRIPTION OF THE INVENTION

Figure 1:
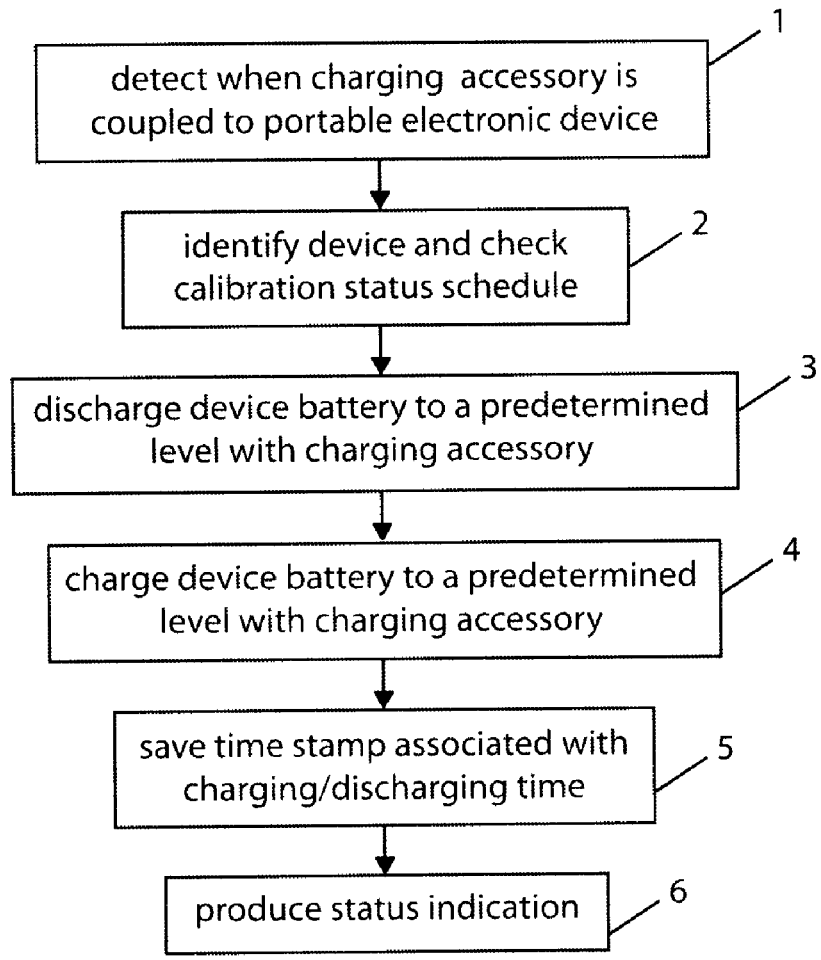
FIG. 1 is a flowchart of a method of automatically calibrating a power level display of a portable electronic device with a power charging accessory.

Referring now to FIG. 1, a flowchart of a method of automatically calibrating a power level display of a portable electronic device with a power charging accessory in accordance with an embodiment of the present invention is shown. The method starts in step 1 wherein the charging accessory detects when it is coupled to a portable electronic device. Once the portable electronic device is detected, the charging accessory identifies the particular device to which it is coupled and checks the device's calibration schedule in step 2. This is preferably accomplished by receiving a device identification code from the device and a checking a data file in the charging accessory to see if and when any calibration routines have been performed on the particular device. If a calibration routine has already been recently performed, the charging accessory simply proceeds to charge the device like a normal charger. In addition, the charging accessory may be provided with a user input that allows a user to display the charging cycle function if desired. However, if no calibration routines have been performed on the device, or a time stamp associated with a calibration routine performed on the device indicates it is time for another calibration routine to be performed, the method proceeds to step 3 wherein the charging accessory discharges the device battery to a predetermined level. This level will typically be a level associated with the battery being fully discharged, but may be selected to accommodate the requirements of the device's power controller. The discharging can be accomplished by enabling a power drawing feature of the device, connecting the battery of the device to a ground connection, or any other manner of draining power from the battery. Once the battery has been discharged to the desired level, the method proceeds to step 4 wherein the device battery is charged to a predetermined level with the charging accessory. This level will typically be a level associated with the battery being fully charged. Alternatively, the charging accessory may simply keep charging the device's battery and the process will end when the fully charged battery no longer presents a load to the charging accessory or the charging accessory is disconnected from the device. Fully discharging and charging the device's battery causes the device's power controller to automatically recalibrate a power level display utilized by the device. A time stamp corresponding to a time the charging and discharging was performed is saved in a memory of the charging accessory in a file associated with the particular device upon which the charging/discharging cycle was performed as set forth in step 5. Finally, in step 6, the charging accessory produces a visual indication of the charging/discharging operation so that a user can determine when the device is fully charged and ready to be used. By automatically charging and discharging the device in accordance with a predetermined schedule, i.e. once every two months, the charging accessory relieves a user from having to perform this function as recommended by the manufacturer of the device and insures that the power level reading of the device is always as accurate as possible.

Figure 2:
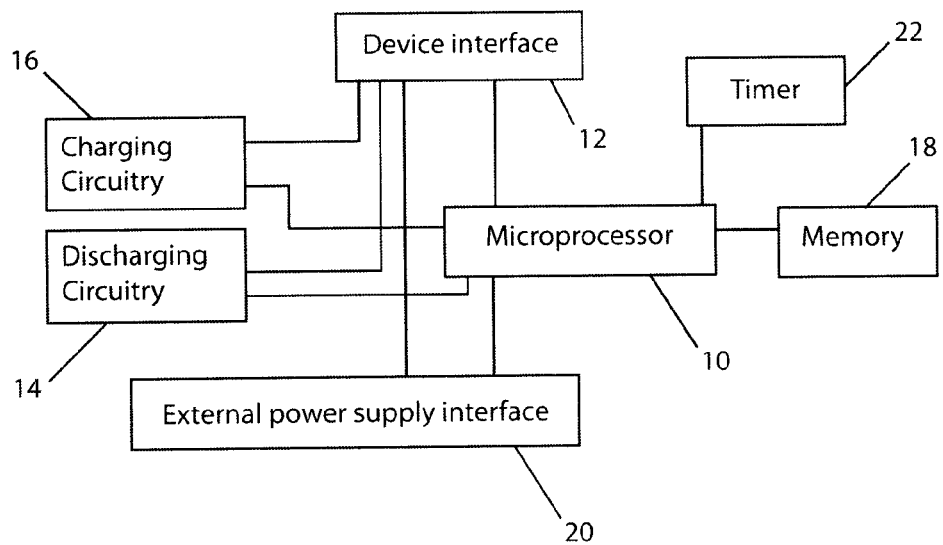
FIG. 2 is a block diagram of the electronics for a power charging accessory constructed in accordance with an embodiment of the present invention.

Referring now to FIG. 2, a block diagram of the electronics for a power charging accessory constructed in accordance with an embodiment of the present invention is shown. The charging accessory is controlled by a microprocessor 10. The microprocessor 10 communicates with the device to be charged through a device interface 12. The device interface 12 is used to retrieve any identification information needed from the device being charged. The identification information is stored in a memory 18 used by the microprocessor 10. In addition, a timer 22 produces a time stamp associated with the discharging/charging operation which is saved in the memory 18. The saving of a time stamp allows the discharging/charging operations to be performed on a particular device in accordance with a schedule as opposed to every time the charging accessory is connected to the device. If no identification information is available from the device, the charging accessory preferably assumes that only one device is being charged by the accessory and that the last charging/discharging operation performed by the accessory was performed on the current device.

The device interface 12 is also used to by the discharging circuitry 14 to discharge the battery of the device and the charging circuitry 16 to charge the battery of the device. The microprocessor 10 may monitor a voltage level of the battery to determine when the device is fully charged and fully discharged and control the discharging/charging accordingly. However, while it is important to know when to stop discharging the battery, the charging can simply continue until the charging accessory is disconnected form the device. Voltage levels representing a fully discharged and fully charged battery voltage level may be stored in the memory 18 for reference by the microprocessor 10 if desired. An external power supply interface 20 may be used to provide the power supply voltage needed to charge the battery. The external power supply interface 20 may be a 12-volt auxiliary power adapter, a FireWire port, USB, AC main, DC block or any other type of well known power interface. If the external power supply provides the correct charging voltage, the charging circuitry 16 may simply be a wire used to transfer the power supply voltage to the device. The ground of the external power supply may likewise be used to discharge the battery in which case the discharging circuitry 14 will simply be a resistor to limit the flow of current from the device battery.

Figure 3A:
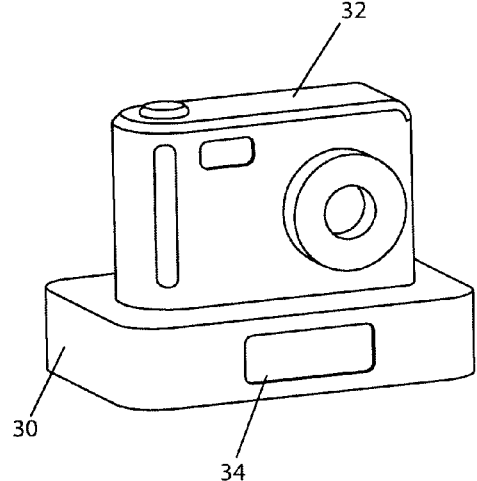
FIGS. 3(a) and (b) are illustrations of preferred physical embodiments of the present invention.
Figure 3B:
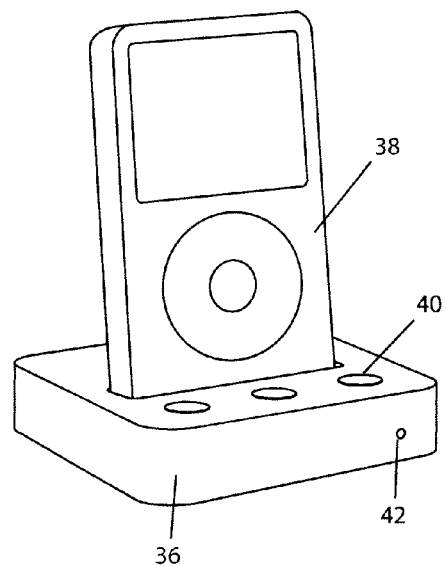

Referring now to FIGS. 3(*a*) and (*b*), illustrations of two preferred physical embodiments of the present invention are shown. The electronics described above with respect to FIG. 2 are preferably contained in the accessory bodies 30 and 36 shown in FIGS. 3 (*a*) and (b). The embodiment of FIG. 3(*a*) consists of an accessory body 30 coupled to a digital camera 32. A display 34 on the accessory body 30 displays a status, such as a battery charge level percentage, of the charging operation. The accessory body 30 contains a connector that couples the electronics of the accessory body 30 to the digital camera's 32 battery. The embodiment of FIG. 3(*b*) has an accessory body 36 that has a connector for coupling the accessory body 36 to the battery of a digital music player 38. The connectors used in the accessory bodies 30 and 36 will of course be selected to couple to the particular type of device 32 and 38 with which the charging accessory will be used. The accessory body 36 has a set of user inputs 40 that allow a user to perform functions such as turning on the charging or disabling/enabling the cycling functionality of the charging accessory. An indicator light 42 is used to display the status of the charging operation.

Although there have been described particular embodiments of the present invention of a new and useful Power Level Display Calibration Device, it is not intended that such references be construed as limitations upon the scope of this invention except as set forth in the following claims.

What is claimed is:

1. A charging accessory for a portable electronic device having an input/output port, said charging accessory comprising:

an input/output port for providing electrical connections to said device's input/output port;

a charger for charging a battery of said portable electronic device while said battery is in said device;

a discharging circuit for discharging said battery of said portable electronic device while said battery is in said device; and a timer and a processor wherein said processor saves a time stamp associated with a charging time and device identification information in a memory and automatically performs a discharging/charging operation for said device according to a predetermined schedule.

2. The charging accessory of claim 1 further comprising an adapter for receiving a power supply voltage.

3. The charging accessory of claim 1 wherein said portable electronic device is a digital music player.

4. The charging accessory of claim 1 wherein said charging accessory further comprises a transmitter for broadcasting a signal received from said portable electronic device to a remote receiver.

5. The charging accessory of claim 1 wherein said charger is an electrical connection to a power outlet.

6. The charging accessory of claim 1 further comprising a display for indicating a status of said charging and discharging.

7. A charging accessory for a portable electronic device, said charging accessory comprising:
  an automatic charging and discharging circuit for automatically discharging and charging a battery of a device while said battery is in said device without any required any user input when said device is connected to said charging accessory in accordance with a predetermined schedule to facilitate calibration of a battery level display of said device;
  a processor for determining when said device battery is fully charged and fully discharged; and a timer wherein said processor saves a time stamp associated with a charging time and device identification information in a memory and automatically performs a discharging/charging operation for said device according to a predetermined schedule.

8. The charging accessory of claim 7 further comprising an input/output port for providing electrical connections to an input/output port of said device.

9. The charging accessory of claim 7 wherein said portable electronic device is a digital music player.

10. The charging accessory of claim 7 wherein said charging accessory further comprises a transmitter for broadcasting a signal received from said portable electronic device to a remote receiver.

11. The charging accessory of claim 7 wherein said circuit includes an electrical connection to an external power outlet.

12. A method of calibrating a battery level display of a portable electronic device with a charging accessory for said device, said method comprising the steps of:
  detecting when said charging accessory is coupled to said portable electronic device; automatically discharging an internal battery of said portable electronic device while said internal battery is mounted inside said device to a predetermined level with said charging accessory in accordance with a charging schedule;
  automatically charging said internal battery to a predetermined level with said accessory such that a battery level display of said portable electronic device is periodically recalibrated to insure said battery level display is accurate; and producing and saving a time stamp associated with a charging time and device identification information and automatically performing a discharging/charging operation for said device according to a predetermined schedule.

13. The method of claim 12 further comprising the step of determining when said device battery is fully charged and fully discharged.

14. The method of claim 12 further comprising the step of producing a visual indication of a status of said discharging and charging.

15. The method of claim 12 further comprising providing a connection to an external power source.

\* \* \* \* \*